(12) United States Patent
Schuller

(10) Patent No.: US 6,318,979 B1
(45) Date of Patent: Nov. 20, 2001

(54) PISTON PUMP

(75) Inventor: Wolfgang Schuller, Sachenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/557,405

(22) Filed: Apr. 24, 2000

(30) Foreign Application Priority Data

Apr. 22, 1999 (DE) .............................. 199 18 126

(51) Int. Cl.⁷ .................................. F04B 53/12
(52) U.S. Cl. ............................ 417/550; 137/860
(58) Field of Search ............... 137/860; 417/545, 417/550, 470

(56) References Cited

U.S. PATENT DOCUMENTS

| | | | |
|---|---|---|---|
| 474,365 | * 5/1892 | Carlin | 417/550 |
| 1,674,718 | 6/1928 | Eisenhauer . | |
| 2,887,961 | * 5/1959 | Hawley | 417/550 |
| 3,787,145 | 1/1974 | Keyes et al. . | |
| 5,232,273 | 8/1993 | Eckstein et al. . | |

FOREIGN PATENT DOCUMENTS

| | | |
|---|---|---|
| 2043002 | 8/1970 | (DE) . |
| 2647768 A1 | 10/1976 | (DE) . |
| 4017956 A1 | 6/1990 | (DE) . |
| 4107979 A1 | 3/1991 | (DE) . |
| 2021682 A | 7/1978 | (GB) . |
| WO 90/15247 | 6/1990 | (WO) . |

* cited by examiner

Primary Examiner—Michael Koczo
(74) Attorney, Agent, or Firm—Ronald E. Greigg

(57) ABSTRACT

The invention relates to a piston pump for a hydraulic slip-controlled vehicle brake system. The invention embodies the piston pump with a hollow piston, in whose circumferential wall one or more valve holes are made, which are covered by a bandlike valve closing body that is mounted on an inside of the circumferential wall of the piston. The invention has the advantage of a simple design of the inlet valve, and the inlet valve makes a small-sized, compact piston pump possible.

8 Claims, 1 Drawing Sheet

PISTON PUMP

BACKGROUND OF THE INVENTION

The invention relates to a piston pump which is intended for use in a hydraulic, slip-controlled vehicle brake system.

Such piston pumps are known per se. Reference may be made for instance to German Patent Disclosure DE 41 07 979 A1. The known piston pump has a piston that is axially displaceably guided in a pump housing and that can be driven by a rotationally drivable cam to execute an axially reciprocating stroke motion. As a result of the reciprocating motion, the piston increases and decreases the volume of a positive displacement chamber, which adjoins the piston on one face end and is defined by a face end of the piston. The change in volume of the positive displacement chamber causes the pumping of fluid by the piston pump in a manner known per se.

For controlling a flow of the pumped fluid through the piston pump, the piston pump has one inlet valve and one outlet valve, both of them embodied as check valves.

OBJECT AND SUMMARY OF THE INVENTION

The piston of the piston pump is embodied as a hollow piston. The positive displacement chamber of the piston pump of the invention is located inside the piston embodied as a hollow piston. Embodying the piston as a hollow piston, which makes it possible to shift the positive displacement chamber of the piston pump into the piston itself, makes a short, compact piston pump possible. The invention has the advantage of reducing the required installation space and in particular of shortening the requisite structural length of the piston pump.

At least one of the check valves of the piston pump of the invention that control the flow through the piston pump has a bandlike valve closing body of a spring-elastic material. For example, the valve closing body can be spring-elastic strip of metal (sheet-metal strip) or some other material. A valve hole is made in the piston and is covered by the bandlike valve closing body. Through the valve hole, a flow of fluid in one direction is possible, that is, into the piston embodied as a hollow piston or out of it; the bandlike valve closing body is lifted from the valve hole by the flow. In the opposite direction, the bandlike valve closing body that covers the valve hole closes the valve hole; a flow through the valve hole in the opposite direction is therefore not possible. The bandlike valve closing body and the valve hole form a check valve; the valve closing body of a spring-elastic material simultaneously forms a valve spring element. Embodying the check valve of the piston pump with a bandlike valve closing body in accordance with the invention has the advantage of a simple valve design and makes economical production of the check valve possible. The check valve furthermore has a single moving part, namely the bandlike valve closing body, making both a separate valve spring element and guidance of the valve closing body unnecessary; the valve closing body is self-guiding because of its bandlike embodiment. Another advantage is that the check valve of the piston pump of the invention can be mounted in a space-saving way on the inside or outside of the piston and requires virtually no additional installation space. Combining the check valve, which has the bandlike valve closing body, with the hollow piston makes a short, compact piston pump possible, which is furthermore simple in its design and simple to produce.

The valve closing body is channel-like; it encloses a hollow chamber between itself and the piston. The valve closing body rests with its longitudinal edges, and at points spaced apart from one another in its longitudinal direction, on the piston, so that the enclosed hollow chamber extends over a portion or virtually the entire length valve closing body and is laterally bounded along the longitudinal edges. The valve hole and piston discharges into the hollow chamber enclosed between the piston and the valve closing body. Because of the channel-like embodiment of the valve closing body, the valve closing body is subjected with fluid not only in the region of the valve hole, or in other words over the relatively small cross-sectional area of the valve hole, but instead over a relatively large area, which extends over a portion or the entire length of the bandlike valve closing body. Thus, a pressure in the valve hole acts upon the valve closing body over a relatively large area, so that even a slight overpressure suffices to lift the valve closing body from the valve hole and thus to open the check valve. In the embodiment of claim 6, even a slight opening pressure thus suffices to open the check valve. The check valve has an improved opening behavior, and the efficiency of the piston pump is improved. Particularly when the check valve is used as an inlet valve, the piston pump of the invention has the advantage of improved aspiration performance and better filling of its positive displacement chamber.

The piston pump of the invention is intended in particular as a pump in a vehicle brake system and is used in controlling the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). The pump is needed for instance in a brake system with wheel slip control (ABS or TCS) and/or a brake system serving as a steering aid (ESP) and/or an electrohydraulic brake system (EHB). With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of an exemplary embodiment taken in conjunction with the drawings.

DESCRIPTION OF THE PREFERRED EMBODIMENT

Figure 1:
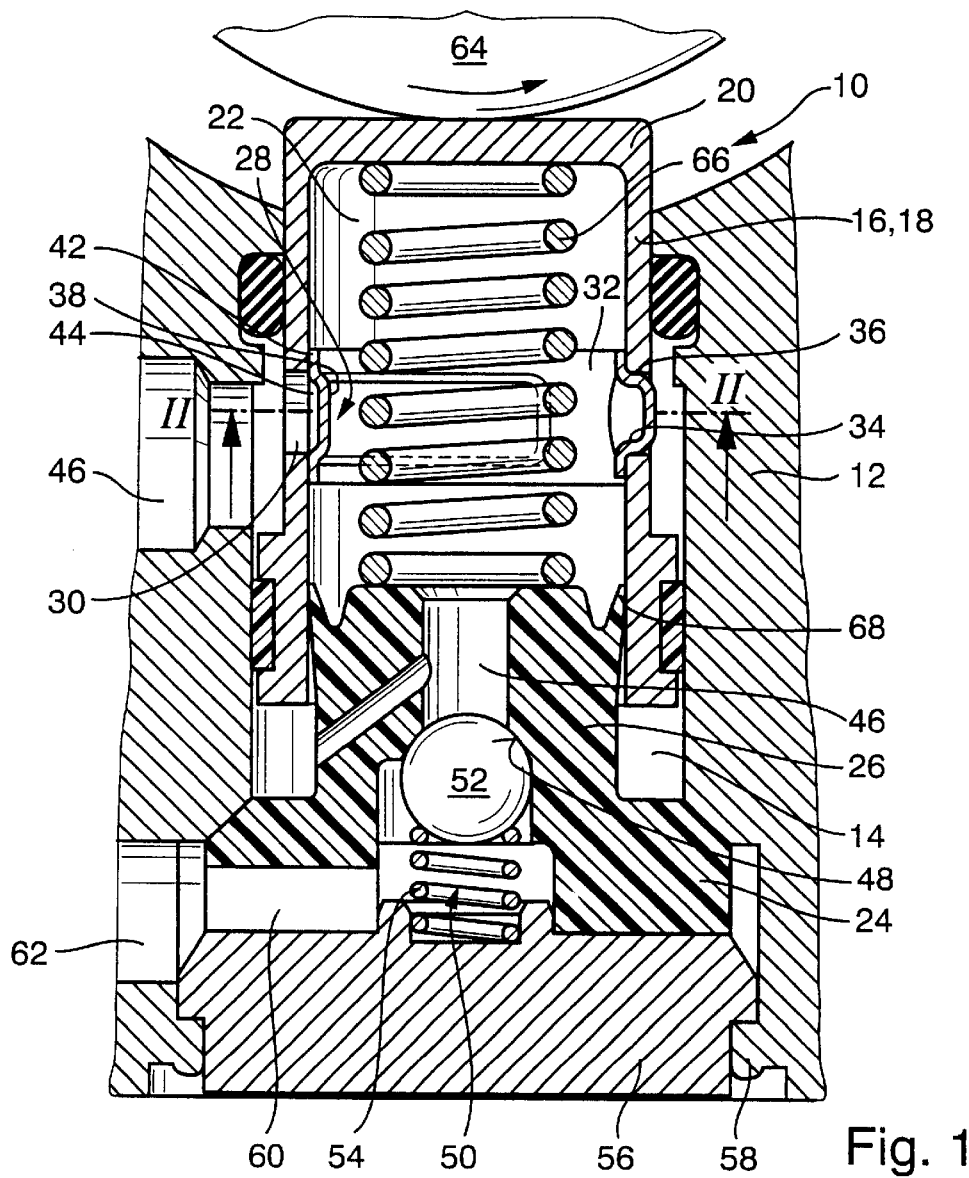
FIG. 1 shows a piston pump of the invention in axial section.

The piston pump 10 of the invention, shown in FIG. 1, has a hydraulic block 12 as a pump housing, of which the drawing shows only a fraction surrounding the piston pump 10. The hydraulic block 12 forms the hydraulic part of a slip-control system of a hydraulic vehicle brake system, not otherwise shown, and in addition to the piston pump 10, other hydraulic components such as magnet valves are inserted into the hydraulic block 12 and hydraulically connected with one another and with the piston pump 10.

A pump bore 14, in which a piston 16 is axially displaceably received, is made in the hydraulic block forming the pump housing 12. The piston 16 is embodied as a hollow piston: it has a tubular circumferential wall 18, which is closed on one face end by a piston end wall 20 that is integral with the circumferential wall 18 of the piston 16. An interior of the piston 16 forms a positive displacement chamber 22 of the piston pump 10. The piston 16 has no undercut or the like; it is produced by reshaping, for instance by deep drawing, upsetting, or extrusion.

The piston pump 10 has an inner part 24, which is mounted in fixed fashion in the pump bore 14 in the pump housing 12, and which has a tanglike extension 26 that protrudes into an open face end of the piston 16. The tanglike extension 26 defines the positive displacement chamber 22 on the open face end of the piston 16.

Figure 2:
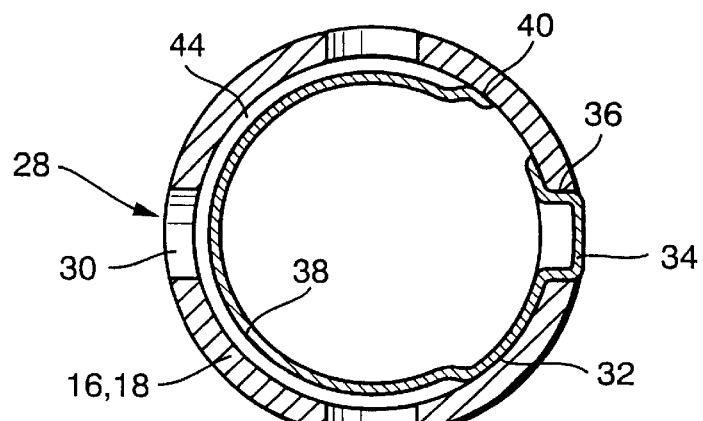
FIG. 2 is a cross-section through the piston of the piston pump of FIG. 1, taken along the line II—II of FIG. 1.

An inlet valve 28 of the piston pump 10 is embodied as a check valve and is accommodated in a space-saving way in the piston 16. The inlet valve 28 is shown in FIG. 2 as well as in FIG. 1. The inlet valve 28, in the exemplary embodiment of the invention shown, has three valve holes 30, which are made in the circumferential wall 18 of the piston 16, offset by 90° from one another, along an imaginary common circumferential line of the piston 16. The number of valve holes 30 can vary between 1 and more than 3.

As its valve closing body 32, the piston pump 10 of the invention has a bandlike element of elastic material, which extends over somewhat less than a full circle in the circumferential direction along the inside circumference of the piston 16. The valve closing body 32 covers the valve holes 30 of the inlet valve 28. In the exemplary embodiment shown, the valve closing body is made from a metal or sheet-metal strip by reshaping.

For fixation in the piston 16, the valve closing body 32, near one end, has an outward-protruding fixation tang 34, which rests in a fixation hole 36 that like the valve holes 30 is made in the circumferential wall 18 of the piston 16. Since the valve closing body 32 rests with initial tension on the inside of the circumferential wall 18 of the piston 16, a relatively loose fixation of the valve closing body 32 in the fixation hole 36 suffices. The fixation can also be embodied as a clamping connection, snap connection or rivet connection, for instance.

The valve closing body 32 has a bead 38, which on one side ends in closed fashion at a free end 40 of the valve closing body 32 and on the other end is at a distance from the fixation tangs 34. The bead 38 lends the valve closing body 32 a channel-like cross-section laterally of the bead 38, longitudinal edges 42 of the valve closing body 32 protrude laterally outward; that is, they are embodied in the axially parallel direction to the piston 16. With the longitudinal edges 42, the valve closing body 32 rests flat on the inside circumference of the piston 16. To improve a sealing action, the longitudinal edges 42 of the valve closing body are coated with silicon or other sealing material (not shown), with which the longitudinal edges 42 rest sealingly on the inside of the circumferential wall 18 of the piston 16. The bead 38 of the valve closing body 42 forms a hollow chamber 44 between the valve closing body 32 and the circumferential wall 18 of the piston 16, which is closed at the longitudinal edges 42 and at the ends of the bead 38. The valve holes 30 discharge into the hollow chamber 44.

The function of the inlet valve 28 is as follows: The piston pump 10 has an inlet bore 46, which discharges into the pump bore 14 radially, approximately at the level of the valve holes 30 of the piston 16. If a volume of the positive displacement chamber 22 increases during an intake or return stroke of the piston 16, then a pressure in the positive displacement chamber 22 decreases; this creates a negative pressure in the positive displacement chamber 22 relative to the pressure in the inlet bore 46. The pressure in the inlet bore 46 that acts on the outside of the bandlike valve closing body 32 lifts the valve closing body 32 from the inside circumference of the piston 16; the inlet valve 28 is now open, and fluid flows out of the inlet bore 46 through the valve holes 30 into the positive displacement chamber 22 in the piston 16. Since the fluid from the inlet bore 46 acts upon the valve closing body 32 over the entire length/area of the bead 38, a slight negative pressure in the positive displacement chamber 22 suffices to open the inlet valve 28; thus because of the embodiment of the valve closing body 32 with the bead 38, a slight opening pressure thus suffices to open the inlet valve 28. By providing a plurality of valve holes 30, a large valve flow through the area is easily attained, which presents only slight flow resistance.

Given equal pressure in the positive displacement chamber 22 and the inlet bore 46, the valve closing body 32 provides sealing because of the initial tension with which it rests on the inside of the circumferential wall 18 of the piston 16; the inlet valve 28 is closed. An overpressure in the positive displacement chamber 22, which acts upon the valve closing body 32 on the inside and presses the valve closing body from inside against the circumferential wall 18 of the piston 16, increases the sealing action of the valve closing body 32; the inlet valve 28 closes reliably and with good sealing action at both low and high pressure in its blocking direction.

Along with its simple design, the inlet valve 28 embodied according to the invention has the advantage of being accommodated in space-saving way in the piston 16. For embodiment as an outlet valve, the bandlike valve closing body 32 would have to be mounted surrounding the outside circumference of the piston 16 (not shown). An outlet valve of this kind can be provided in addition to the inlet valve 28 shown or can be provided by itself.

The outlet from the piston pump 10 of the invention is through the inner part 24. The inner part 24 is provided with an axial through-hole 46, which widens at a conical annular shoulder that forms a valve seat 48 of an outlet valve 50. The outlet valve 50 is embodied as a spring-loaded check valve; it is accommodated in the through-hole 46 in the inner part 24. The outlet valve 50 has a valve closing body in the form of a valve ball 52, which is pressed against: the valve seat 48 by a helical compression spring that forms a valve closing spring 54. The valve closing spring 54 is braced on a disk-like stopper part 56 that is inserted into the pump bore 14. The stopper part 56 is held in the pump bore 14 by an encompassing calking 58 of the pump housing 12; together with the stopper part 56, the calking 58 all the way around closes the pump bore 14 in pressure type fashion. The stopper part 56 in turn keeps the inner part 24 inside the pump bore 14.

Fluid emerging from the positive displacement chamber 22 through the outlet valve 50 passes through radial conduits 60, mounted in a star pattern on the inner part, into an outlet bore 62, which is provided radially to the pump bore 14 in the pump housing 12.

For the drive of the piston 16 to execute an axially reciprocating stroke motion in the pump bore 14, the piston pump 10 has a cam 64, which is driven to rotate by an electric motor and is disposed on the closed face end of the piston 16; the piston 16 rests with its piston end wall 20 on the circumference of the cam. In order to keep the piston 16 with its piston end wall 20 in contact with the circumference of the cam 64, the piston pump 10 has a piston restoring spring 66. The piston restoring spring 66 is embodied as a helical compression spring; it is inserted into the positive displacement chamber 22 and is braced on the tanglike extension 26, protruding into the open face end of the piston 16, of the inner part 24 that is fixed in the pump bore 14, and it presses from inside against the piston end wall 20.

The inner part 24 is made of plastic. Its tanglike extension 26 has an encompassing sealing lip 68 in one piece with the extension, which rests on the inside on the circumferential wall 18 of the piston 16 and seals off the positive displacement chamber 22.

The foregoing relates to a preferred exemplary embodiment of the invention, it being understood that other variants and embodiments thereof are possible within the spirit and scope of the invention, the latter being defined by the appended claims.

I claim:

1. A piston pump, comprising a piston (16) that is driven in a reciprocating stroke motion, a check valve (28) that controls a flow direction through the piston pump, the piston (16) is embodied as a hollow piston with a wall (18), whose interior forms a positive displacement chamber (22) of the piston pump (10), the check valve (28) includes a valve hole (30), which is made in the piston (16) and has a channel-like valve closing body (32) that is mounted on the piston (16) with an open face of a channel (38) that covers the valve hole (30) of the piston (16), said valve closing body comprises a spring-elastic material, and at a same time forms a valve spring element.

2. The piston pump according to claim 1, in which the valve hole (30) is made in a circumferential wall (18) of the piston (16).

3. The piston pump according to claim 2, in which the valve closing body (32) is mounted extending on the piston (16) in the circumferential direction of the piston (16).

4. The piston pump according to claim 3, in which the valve closing body (32) is mounted on an inside wall of the piston (16).

5. The piston pump according to claim 1, in which the piston (16) has a fixation hole (36), and that the valve closing body (32) has a protrusion (34), with which the valve closing body engages the fixation hole (36) so as to be mounted on the piston (16).

6. The piston pump according to claim 1, in which the piston (16) has a plurality of valve holes (30), which are covered by the valve closing body (32).

7. The piston pump according to claim 1, in which the valve closing body (32) is a sheet-metal strip.

8. The piston pump according to claim 1, in which the piston (16) is a reshaped part.

* * * * *